United States Patent Office 3,018,581
Patented Jan. 30, 1962

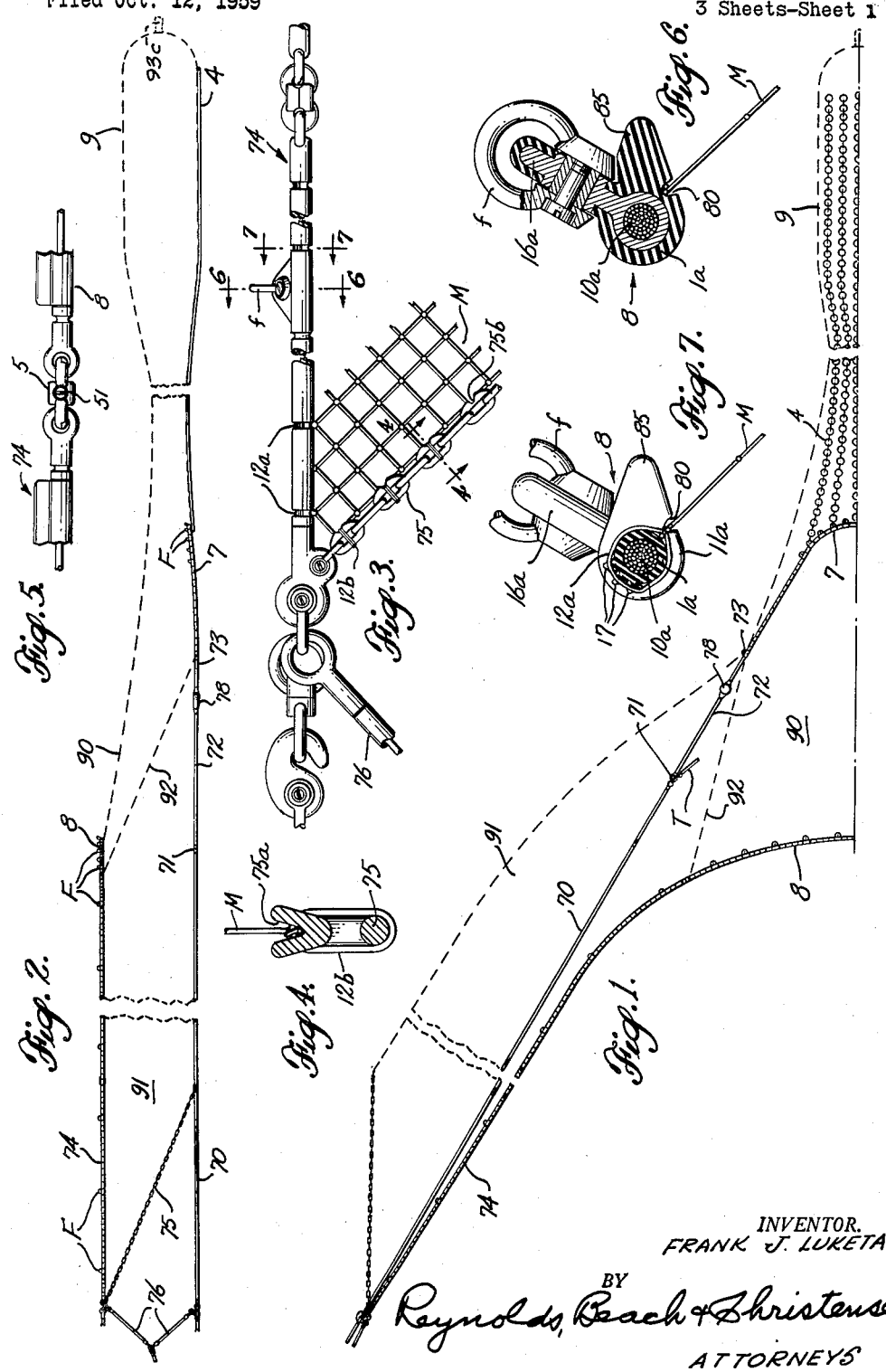

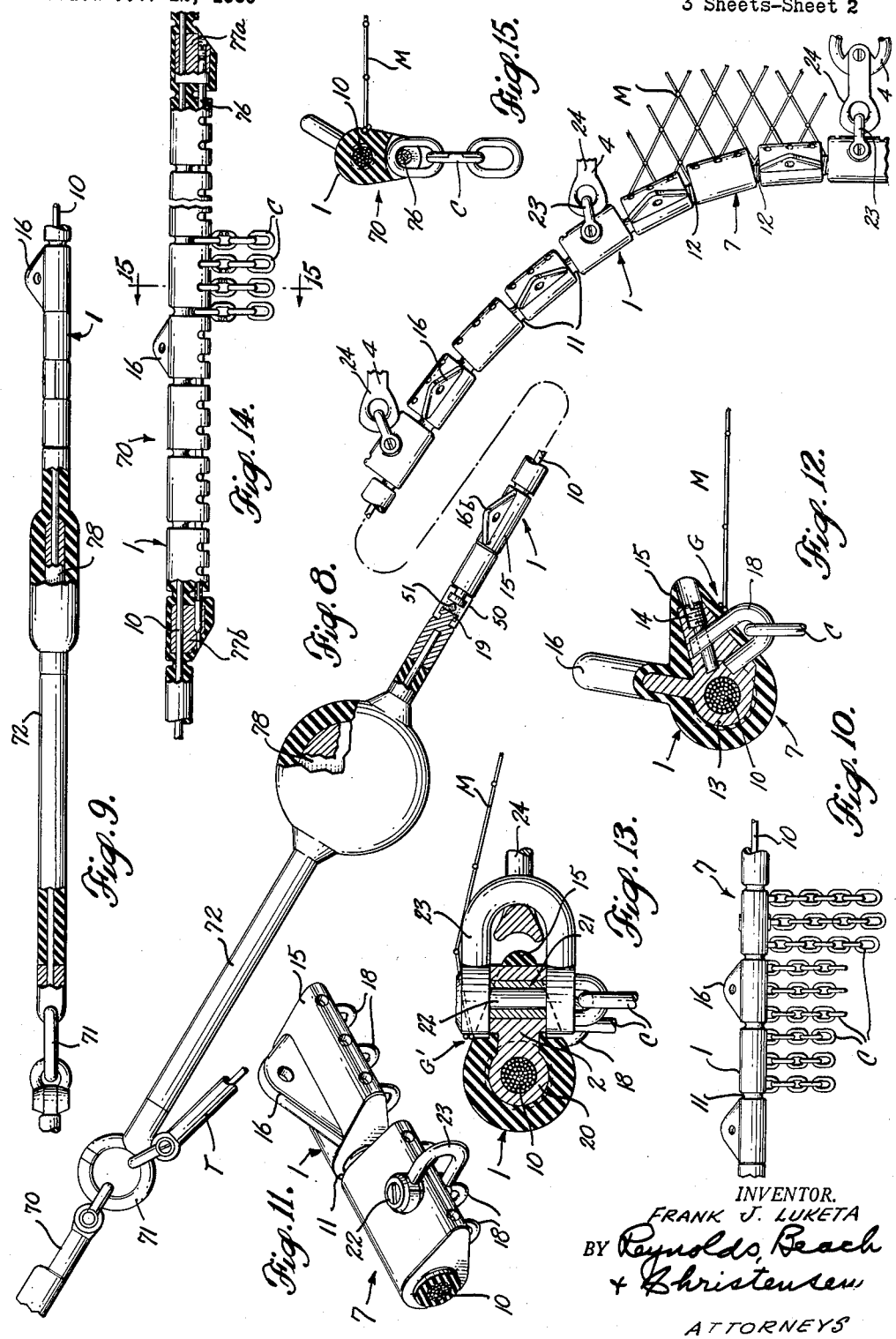

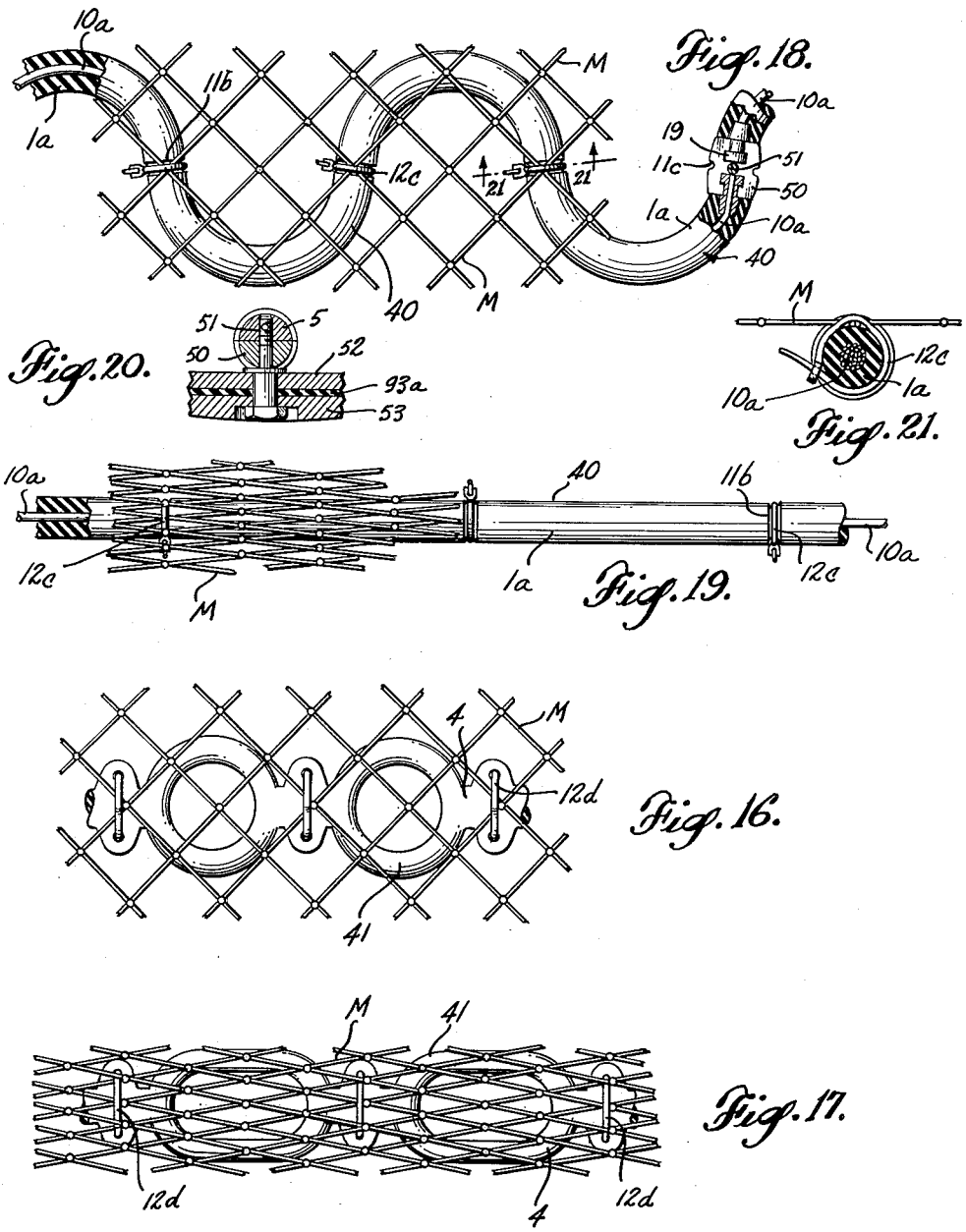

3,018,581
TRAWL LINES
Frank J. Luketa, 5567 Greenwood Ave., Seattle, Wash.
Filed Oct. 12, 1959, Ser. No. 845,799
14 Claims. (Cl. 43—9)

Trawl nets include various accessories, such as floats, weights, bottom dragging chains, riblines, etc. Most of these, for best operation, must be oriented correctly in the water, and the principal source of orienting forces is the forces active upon the net meshes, among them the drag of weights and floats, the pull of the trawler, and water reaction forces on the net meshes or on special water reaction vanes or like surfaces, and the opposing forces produced by the pull on towing warps, sweep lines and the like. This invention concerns the various lines, and particularly the manner in which the lines and the accessories carried thereby are assured of correct orientation by the several forces active upon the mesh, and by the orientation of the lines relative to the mesh and to the accessories, for otherwise there is a rather high degree of probability that a disoriented accessory or net element will become fouled, or will malfunction, to the detriment of the trawl then proceeding, and with possible damage to the net.

The mesh squares of a net, intermediate the knots, in any given part of the net, are of a given size, that is, of a given length along each side, and should be secured at regular and corresponding intervals to the lines which define their margins. In some parts of the net, for example across a bosom, the mesh is tensioned more in some areas than in other areas, yet the securement of the edge of the mesh to a bosom-defining line should be still at the regular intervals—not necessarily at intervals of individual squares, but perhaps multiples thereof—so that the stresses within the mesh are properly graduated and transferred between the line and the mesh, and not unduly nor irregularly concentrated at certain points of attachment. The lines of this invention are so formed that correct attachment is virtually assured, without appreciable care or skill on the part of the net rigger.

Certain lines in the net disclosed in my companion applications Serial Nos. 834,030 filed August 17, 1959, and 844,556 filed October 5, 1959, not only are secured to the mesh, but also serve as anchorages for accessories; for instance a bosom-defining line has floats anchored to it at intervals, bottom-dragging chains, and riblines. By this invention there are provided lines which have these several capabilities, and which are so organized and arranged as to coordinate the several requirements.

Some lines, as in application Serial No. 844,556, are desirably made in sections successively joined end to end, while others need not be sectional but must be anchored at an end to other lines, between the ends of the latter. Such joints must be easily joined or disconnected. By this invention joints particularly suited to the requirements in such usage are provided.

In trawling operations heretofore certain lines, whereto the mesh is secured, are subject to chafing, and both to protect the lines themselves and the ties whereby the mesh is secured thereto, it is customary to seize the lines and the mesh ties with close wrappings of a protective rope. Whenever repair is necessary, it adds materially to the time and labor that these seizings must be removed, and later replaced. This invention provides a line which is inherently resistant to chafing and requires no seizing, and one whereto the mesh is tied or secured in a simple, easily accessible manner, yet in a manner such that the ties are unlikely to be damaged in use. Such a line has the further advantage of long life, and consequently lower cost.

Various other detailed objectives will appear more fully hereinafter.

The drawings illustrate the principles of the invention embodied in various types of lines, for use at different locations on the net, and the principles with which the invention is concerned will appear more fully hereinafter.

FIGURE 1 is a general half-plan view of the net, outlined in dash lines, and illustrating mainly certain of the lines, and FIGURE 2 is a general vertical longitudinal view of the net, similarly outlined, and showing the lines, in both instances with parts in a position they will assume while trawling.

The remaining figures show individual lines or portions thereof, and details of the anchorage of the lines to the mesh or of accessories to the line.

FIGURE 3 is an elevational view of the curtain line and breast line at the forward end of a curtain.

FIGURE 4 is a section transversely through the breast line, at the line 4—4 of FIGURE 3.

FIGURE 5 is a plan view of a typical connection between two sections of line, as for example, between a bosom line and a sweep line.

FIGURES 6 and 7 are cross-sections at the respective lines 6—6 and 7—7 of FIGURE 3, illustrating anchorages of different nature to a sweep or curtain line.

FIGURE 8 is an interrupted plan view, and FIGURE 9 is a side elevation, both partly broken away, illustrating a weighted initial portion of the lower sweep line, and in FIGURE 8, also the lower bosom or ground line.

FIGURE 10 is an elevation of a short length of ground line, illustrating a chain wall.

FIGURE 11 is an isometric view of a portion of the ground line, and FIGURE 12 is a cross-section of a detail thereof.

FIGURE 13 is a cross-section of the anchorage of a ribline to a bosom or ground line.

FIGURE 14 is an elevation, partly in section, of a modified form of ground line, and FIGURE 15 is a cross-section at the line 15—15 of FIGURE 14.

FIGURES 16 and 17 are plan views of a ribline and the net meshes to which it is secured, in relaxed and in tensioned condition, respectively. Certain features of this ribline are claimed in my companion application entitled Protective Gear for Trawl Nets, Serial No. 844,556 filed October 5, 1959, and certain other features are claimed herein.

FIGURES 18 and 19 are views corresponding to FIGURES 16 and 17, showing a different form of ribline, also claimed in part in the application just referred to, and in part herein.

FIGURE 20 is a transverse section through a connector for two sections of ribline of the type shown in FIGURE 18, and through a connected chafing strip.

FIGURE 21 is a transverse section at the line 21—21 of FIGURE 18, through a tie for tying the mesh to the line.

Referring first to FIGURES 1 and 2, a net of the type for which the lines of this invention was devised is shown in these figures. It is not to be implied that the lines have utility only with such a net, but the lines are peculiarly suited for use with the same. The net body, outlined in dash lines, includes the codend and intermediate section collectively designated by the numeral 9, and an overhang 90. These terminate at the forward end in upper and lower bosoms, which are defined respectively by the relatively short float line 8 and ground line 7, both of which may be termed bosom-defining lines, and which are secured to the edge of the mesh. Curtains 91 at each side are joined along seams 92 to the net body, and extend divergently forwardly during use, being spread apart by doors (not shown) that are secured ahead of the curtains. Sweep lines extend forwardly from the net body to the doors, and these rather than the curtains assume the drag of the net. The lower sweep line 70, so-called, attaches at 71 to a weighted initial section 72, and through the latter is attached at 73 to an end of the ground line 7. The curtain is not secured to this sweep line 70, but is suspended by its upper edge from the upper sweep line, termed the curtain line, 74. The forward edge of the curtain 91, in order to protect it and to stretch this edge up and down, is secured to a weighted breast line 75 (see FIGURES 2 and 3) that hangs and extends diagonally from the curtain line 74, in the vicinity of the bridle 76, used in hauling the net, to the ocean bottom.

The curtain line 74, the float line 8, the ground line 7, and certain other elements of the gear, are buoyed up by floats suggested at F, which must be anchored in a certain orientation to these lines. Bottom-sweeping chains C, which also must hang down with certainty, are closely distributed along the ground line 7, depending therefrom to close the gap between the ocean bottom and the somewhat buoyed-up ground line. A heavy tickler line may extend across the mouth of the net to drag the bottom and to stir up bottom fish before the net passes over them; its initial portion is shown at T, and if used it would be anchored at 71 to the sweep line 70. Riblines 4 or 40, the anchor element of which is shown at 24 in FIGURE 8, are used in conjunction with the net body 9, both to limit the extent of tears and as supports for chafing gear 93a, see FIGURES 2 and 20.

For details of the net, reference is made to my applications Serial Nos. 834,030 and 834,031, both filed August 17, 1959; details of floats are disclosed in my application Serial No. 835,471 filed August 24, 1959, and details of the riblines are shown in my application Serial No. 844,556, filed October 5, 1959.

It will become apparent that if the various accessories, such as the floats F and chains C, are not correctly and automatically oriented, in use, not only will the gear as a whole function inefficiently, but parts may become fouled in the mesh M and initiate tears therein. If the floats bob up beneath the mesh behind the lines 7 or 8, the net is fouled, and if the floats are of the planing type of my float application above, Serial No. 835,471, they will not produce the intended buoyance, and the net may sag or become snagged. Much the same result would follow from the chains C overlying the mesh behind the line 7. It is quite important, therefore, that each accessory be correctly oriented as it goes overboard in the setting operation, and this requires that the line to which it is anchored, and mesh secured to the line, be correctly oriented, primarily by the drag of the trawler upon the lines, and by water reaction forces upon the mesh.

The mesh will, in all instances, be oriented in all local areas in a predictable manner by the opposed forces pulling and dragging it but its orientation will differ in different parts of the net. The trawler and trawl lines, and the sweep lines, etc., pulled thereby, pull the net ahead, and the water reaction upon the meshes, pull the bottom drag on weights, chafing gear, etc., and the water drag on floats, stretch the meshes and the mesh surfaces in a given orientation in its respective areas. This orientation of the meshes, if communicated through lines in correct orientation to the meshes, and to accessories correctly oriented relative to the lines, affords a means of obtaining and maintaining correct orientation of all accessories. The principle is therefore followed that the edge of the mesh, in its attachment to a line, is received within a groove extending lengthwise of the line, in order to orient the line correctly, and the accessories, which when applied to the line, have been oriented correctly with respect to this intended orientation of the line, are of necessity correctly oriented relative to the mesh. The grooves referred to may be longitudinal troughs in the line, or may be constructively formed by outstanding elements relatively angularly disposed. Their orientation, about the axis of the line, is generally such that when the mesh edge is secured within the groove, the plane of the immediately adjacent mesh surface will coincide with the axis of the line. Accessories anchored to the line are correctly oriented by their securement close to the line upon bases such as ears or the like which are arranged at the correct angle to the intended orientation of the lines, so that if the mesh and the longitudinal groove in the line wherein the mesh is received orient the line correctly, the ears will properly orient the accessory.

The ground line 7 may be taken as an example, and is shown in FIGURES 8 to 13. It is likely to be subject to chafing from bottom contact, notwithstanding that it is buoyed up, and includes a core 10 of wire rope or cable surrounded by a continuous sheath 1 of abrasion-resistant material, such as rubber or neoprene. At regular intervals, corresponding to the size of the mesh squares, or multiples thereof, the line, in the sheath portion, is circumferentially grooved, at 11. Ties 12 of a continuous hanging twine, received in these grooves 11, and engaging the edge of the mesh at intervals that correspond to the spacing of its squares, secure the mesh to the line. The described spacing between grooves 11 makes it a simple matter to spread the mesh squares correctly, not too widely nor too closely.

The edge of the mesh and the hanging twine are rerecievd within a longitudinal groove, described below. The mesh M stretches horizontally aft. The ground line 7 supports depending, ground-sweeping chains C, and U-shaped loops 18 have their legs received in apertures within a base such as a metal block 13 surrounding the core 10 and surrounded by the sheath 1; a locking pin 14 threaded in the block 13 and past a groove (not shown) in a leg of the loop 18 retains the loop removably in place, supporting a chain C. The downwardly projecting loop 18 and the streamlining vane 15 projecting aft from the line define between them, at the after side of the line, a longitudinal groove G for the reception of the edge of the mesh; see FIGURE 12.

The ground line 7 also is engaged by floats preferably of the type shown in Serial No. 835,471 which buoy it up largely by water reaction. An eye 16, which may be integral with the block 13 but also sheathed over, projects upwardly and somewhat aft, with the line in its correct orientation, for direct mounting of a float F, as by shackle f; see FIGURE 7.

The ground line 7 also anchors riblines 4 or 40, shown in some detail in FIGURES 16 and 21, which extend aft beneath the net body, both for connection of chafing gear 93a and to limit tears in the mesh of the net body. Such an anchorage for a ribline is shown in FIGURES 11 and 13. A base such as the metal block 20 surrounds the core 10 and is sheathed by the sheath 1. A rearward extension 2 of block 20 is bored vertically to receive a bushing 21 and pivot pin 22 whereby a clevis 23 is secured to the line, and in turn engages an anchor element 24 which is part of a ribline. In this portion of the ground line, since the ribline underlies mesh, the mesh edge overlies the streamlining vane 15. The groove G' is necessarily located somewhat higher than at G, in this localized portion.

A modified form of ground line 70 is shown in FIGURES 14 and 15. Here the core 10 is covered with the sheath 1, but the chains C are supported from a second line 76 extending through the sheath parallel to and beneath the core 10. The ends of the line 76 are anchored in blocks 77a, 77b secured upon the core, and intermediate portions are supported in the sheath, which may be extended somewhat to encompass the line 76.

The initial section 72 of the sweep line 70 is weighted to hold it to the bottom and with it the end of the ground line 7, which elsewhere is buoyed up, and thereby to preclude the existence of a gap between the lower bosom line 7 and the bottom. The weight 78 is preferably formed as a flat disk, to this end, covered with a sheath of rubber as is the rest of this section 72. No circumferential nor longitudinal grooves are needed, since no part of the mesh is secured to it.

The upper bosom-defining line 8 and curtain line 74 are similar to the lines 7 and 70, but require only anchorages for floats, there being no depending chains, and the mesh naturally trails somewhat downwardly and aft, rather than directly aft, as in the former case. FIGURES 6 and 7 show detail cross-sections of this float line 8. Since the edge of the mesh, as it trails downwardly and aft, engages the under side of the line, the groove 80 is located beneath the line, towards its aft side. This correctly orients the eyes 16a, which constitute bases to which floats are attached. Circumferential grooves 11a are spaced at intervals in the length of the line 8, corresponding to the size of the mesh squares. Ties 12a of a hanging twine secure the edge of the mesh M to the lines 8 and 74, and are tied in the circumferential grooves 11a. To prevent slippage of the ties 12a, and thus further to insure correct orientation of the line relative to the mesh, the grooves 11a are formed with transverse ribs 17 of rubber or the like, molded in place across the grooves 11a, which are deformed by the ties 12a, and which pinch the ties to grip the same. Such ribs 17 may be employed in the grooves 11 of other lines, as 7. The streamlining vanes 85 lie generally horizontally.

The breast line 75 is also preferably grooved longitudinally and circumferentially, as FIGURES 3 and 4 show at 75a and 75b, respectively, the latter receiving ties 12b, and the former receiving the adjacent mesh edge. Any other lines to which mesh, floats, weights, or the like are secured are similarly grooved.

Riblines for securement to the mesh of the net body 9 are shown in one form in FIGURES 16 and 17, and in a different form in FIGURES 18 and 19. In either form the riblines 4 or 40 are elastically extensible and contractible in the longitudinal direction substantially as freely as the mesh M of the net body 9 to which they are secured at frequent intervals in their length. The deformation is illustrated in FIGURES 16 and 17, and in FIGURES 18 and 19, the first in each instance representing the mesh as fully relaxed and the second representing it as nearly fully tensioned. These forms of riblines are shown as part of the protective gear in my application Serial No. 844,556 referred to above, and their elastically extensible and contractible form is claimed therein, but in the manner in which the lines are formed and sheathed, and are secured at intervals defined by the ties 12b or 12c and by the circumferential grooves 11b, these riblines are part of the invention claimed herein.

The riblines of the type shown in FIGURES 16 and 17 include circles or loops 41, and since the entire ribline 4 is of a material such as rubber or neoprene, and need not include a core, the loops 41 may elongate as the mesh M elongates, the ribline 4 being tied to the mesh at 12b at intervals of two knots, or in any other suitable number, at frequent intervals. The line will also contract in length freely, as the mesh M relaxes; this is more fully explained in my application Serial No. 844,556. The line 40 is of sinuous form, and the ties 12c, at intervals of two knots, are received within the circumferential grooves 11b. These ties 12c may be nylon or rubber rat tails, the free end whereof extends through and is gripped by a loop at its opposite end, as FIGURE 21 shows. The line 40 has a core 10a and a sheath 1a, the core resisting stretch of the line after the line is pulled straight. The ties 12c may be similar to the ties 12b.

The several lines, and also the riblines, may be sectional, several lengths being joined end to end to make up the full length. A typical joint between sections is shown in FIGURES 18 and 20. Knobs 19 are swaged on the adjoining ends of cores 10a, and these are engaged by complemental half-clamps 5, 50, which are held together by a clamping bolt 51. The bolt 51 may also serve to secure pivotally the metal clamps 52, 53 which clamp between them a chafing strip 93a, which is part of the chafing gear. The half-clamps are formed with a circumferential groove 11c which serves to receive a tie 12c.

The lines are shown with vanes formed upon them and projecting generally aft; these are designated 15 or 85. To a minor degree these are water reaction surfaces which would tend to orient the lines, but the opposing forces of drag upon the net meshes engaged within the longitudinal groove of the lines, and of pull of the trawler upon the lines, constitute orienting forces so much larger that the orienting effect of the vanes mentioned is negligible for the most part.

I claim as my invention:

1. In combination with a trawl net of mesh, which by reaction between the opposed forces of pulling the net through the water and of drag resisting such pulling tends to assume a given orientation in each local area, a line for connection to the mesh, and means interengageable between said line and the mesh to secure together the line and mesh, said means including means to orient the line at a selected angular orientation about its axis, and mounting means for an accessory, carried by said line and, when the line is so oriented, being itself so oriented angularly about the axis of the line as to orient the accessory automatically in an intended orientation relative to the mesh.

2. The combination of claim 1, wherein the line is longitudinally grooved at such angle from the vertical about its axis as corresponds to the plane which includes such axis and the immediate net mesh surface, the edge of the mesh being received in such groove.

3. The combination of claim 1, wherein the mesh squares, when relaxed, are of a given length along each side, certain of said lines having circumferential grooves spaced by whole multiples of such given length, and the securing means being received in said grooves.

4. In combination with a trawl net of mesh, lines for connection along edges of the mesh, certain of said lines being externally longitudinally grooved for the reception of an edge of the mesh, to maintain the lines when secured to the mesh in a given orientation relative to the general extent of the mesh, and means to secure the edge of the mesh at intervals to said lines.

5. The combination of claim 4, wherein the lines include circumferential grooves spaced along the lines in accordance with the size of the mesh, for the location of the respective securing means.

6. In combination with a trawl net of mesh, lines for connection to said net including a line defining a bosom of the net, said bosom-defining line including a substantially inelastic core and a protective sheath, said sheath being longitudinally grooved for the reception of an edge of the mesh, to maintain the line in a given orientation relative to the general extent of the adjacent portion of the mesh as the latter is drawn through the water, means to secure the edge of the mesh at intervals to said sheath, and anchorage means anchored to the core and outstanding from the line at a given orientation about the axis of the line, for the engagement of accessories.

7. The combination of claim 6, the sheath being circumferentially grooved at regular intervals in its length, corresponding to the spacing of the squares of the mesh, the securing means being received in said grooves.

8. The combination of claim 7, wherein the sheath is of a rubber-like material, and the securing means are ties received in the grooves, and including ribs disposed transversely of the grooves and deformable by the securing means to retain the latter against rotation within their grooves.

9. The combination of claim 6, wherein the anchorage means comprises an eye outstanding from the line and, when the line is oriented by the mesh, is inclined upwardly and aft, for anchorage of a float.

10. The combination of claim 6, wherein the anchorage means comprises a loop outstanding from the line and, when the line is oriented by the mesh, is inclined downwardly and aft, a bottom-dragging chain anchored to said anchorage means, and means for removably securing said loop to the chain.

11. In combination with a trawl net of mesh, lines for connection to said net including a line defining a bosom of the net, said bosom-defining line including a substantially inelastic core and a protective rubber-like sheath, said sheath having circumferential grooves at intervals in its length which correspond to the size of the mesh squares, water reaction vanes outstanding from the sheath and assisting in orienting the line, anchorages anchored to the core and, when the bosom-defining line is so oriented, inclined upwardly and rearwardly from and at spaced intervals along the line, U-shaped links directed downwardly and aft from the line and anchored to the core, and defining a groove with relation to the water reaction vanes, the edge of the mesh being received within said grooves, and tie means received in said circumferential grooves and securing the edge of the mesh to the line.

12. The combination of claim 11, including clevises extending aft at intervals in the length of said line, and clevis-anchoring means anchored to and oriented with respect to the core and enclosed by the sheath, located to be engaged by the several clevises.

13. In combination with a trawl net of mesh, including a net body having upper and lower bosoms, a line secured to the net mesh along said lower bosom, means to buoy up the lower bosom-defining line, weighted means depending from the same line to drag the bottom, a sweep line extending divergently forwardly from the ends of said lower bosom-defining line, along the bottom, and including a separate initial section, attached to the bosom-defining line, and a flat weight carried by said initial section, to eliminate any gap between the bottom and the ends of the lower bosom-defining line.

14. The combination of claim 13, wherein the several lines, and the flat weight, are encased within a protective, abrasion-resistant sheath.

References Cited in the file of this patent

UNITED STATES PATENTS

| | | |
|---|---|---|
| 1,073,776 | Neville | Sept. 23, 1913 |

FOREIGN PATENTS

| | | |
|---|---|---|
| 90,478 | Norway | Nov. 25, 1957 |
| 739,981 | Germany | Oct. 9, 1943 |